3,106,773
**PROCESS FOR BONDING ZIRCONIUM
AND ALLOYS THEREOF**
Donald Jaffe, Pleasant Hills Borough, and Ezekiel F. Losco, Whitehall Borough, Pa., assignors to Westinghouse Electric Corporation, East Pittsburgh, Pa., a corporation of Pennsylvania
No Drawing. Filed June 7, 1961, Ser. No. 115,295
3 Claims. (Cl. 29—487)

This invention relates to a novel process for bonding zirconium and the alloys thereof without adversely affecting the corrosion resistance of the bonded members.

Zirconium itself, but more especially zirconium base alloys, are presently employed in applications where substantial strength and corrosion resistances are required. As an example, in U.S. Patent No. 2,772,964 of D. E. Thomas et al., issued December 4, 1956 and directed to "Zirconium-Base Alloys," there is disclosed a family of workable zirconium and tin alloys comprising amounts of at least one of nickel, iron and chromium, having good resistance to corrosion and high strength. These alloys have found wide commercial acceptance and are presently sold under the generic name "Zircaloy."

Such zirconium-base alloys and zirconium itself are the materials to which the present invention in bonding is addressed. At the present time, a pressure bonding process is employed to attain solid state bonds between zirconium and zirconium base alloy members in a variety of components for high temperature application in corrosive environments.

In the pressure bonding process, the surfaces of the zirconium and zirconium-base alloy members to be pressure bonded are first prepared by belt abrading to attain a desired degree of surface smoothness and conformity, and are carefully cleaned. Bonding of the members is then accomplished by subjecting the assembled members to a highly critical temperature-pressure-time cycle.

When the appropriate critical conditions of temperature, pressure and time are employed, bonding of the zirconium alloy members occurs by growth of individual grains from each member across the original interface of the members, resulting in a microstructure in which it is difficult or impossible to differentiate the bond area from the remaining material by metallographic examination. However, when the bonding cycle departs even slightly from the critical conditions required, the desired grain growth across the original interface occurs only to a small extent, or not at all, and an unsatisfactory bond results.

Unsatisfactory bonds of the type described above have occurred often enough so as to stimulate considerable investigation into the precise conditions required to establish the kind of bond desired. Unfortunately, a substantial body of evidence has been accumulated indicating that in order to consistently obtain grain growth across the original interface of the members, and hence high quality bonds, a temperature must be employed which results in the transformation of an appreciable portion of the zirconium-base alloys from the low temperature alpha phase (which has a hexagonal close packed crystal structure) to the high temperature beta phase (which as a body centered cubic crystal structure). The temperature required to transform to an appreciable extent the zirconium and zirconium-base alloys presently employed from alpha phase to beta phase is upwards of 1550° F.

The practical superiority of the beta phase over the alpha phase in the bonding process is predictable from theoretical considerations. The mechanism of grain growth across the interface of zirconium-base alloys is primarily a transfer of atoms of zirconium by diffusion across the contacting points on the initial interface, and it is generally true that diffusion rates of a given element through a body-centered cubic type lattice, such as the beta phase of zirconium alloys, is much higher at a given temperature than through a hexagonal close-packed lattice, such as the alpha phase of zirconium-base alloys. Recently published data indicate that in a structure in which alpha and beta zirconium were coexistent at 1550° F., the self-diffusion coefficient for zirconium is almost 100 times greater in the beta phase than in the alpha phase.

It is thus seen that both on practical and theoretical grounds, the presence of the beta phase is desirable and necessary for bonding zirconium-base alloys. On the other hand, it has been found that zirconium-base alloy components which have been subjected to a temperature at which an appreciable amount of the beta phase is formed, suffer a very serious loss of corrosion resistance in high temperature corrosive environments, as compared to alloy components which have retained the alpha structure throughout processing and in use. Accordingly, it is seen that under the present bonding procedure the temperature conditions for high quality bonds and high corrosion resistance are incompatible, so that if good bonds are to be obtained corrosion resistance must be sacrificed, while if corrosion resistance is to be maintained, inferior bonds are inevitable.

It is the primary object of this invention to provide a bonding process for joining zirconium and zirconium-base alloy members in which only the region of the joint interface will be transformed to an appreciable extent from the alpha to the beta phase to promote the formation of a good bond, and thereafter, by diffusion, to obtain substantially complete retransformation from the beta phase to the alpha phase at the joint interface.

It is another object of this invention to provide at the joint interface of zirconium and zirconium-base alloy members which are to be bonded, an extremely small amount of an alloying element having the effect, when alloyed with zirconium and zirconium-base alloys of lowering the allotropic transformation temperature, and thereby promoting the development of good bonds through the formation of the beta phase at the interface, and thereafter, by diffusion, retransforming substantially all the beta phase to the alpha phase, thereby achieving high corrosion resistance in the region of the joint interface.

Other objects of the invention will, in part, be obvious and will, in part, appear hereinafter.

This invention is directed to a novel process for bonding members composed of zirconium and zirconium-base alloys in a manner to produce sound bonds of good strength without adversely affecting the inherently good corrosion resistance properties of the alloy members. More specifically, the process is intended to develop good bonds in zirconium and zirconium-base alloy members composed of a first phase characterized by high corrosion resistance properties and involves (1) depositing a thin layer of at least one element selected from the group consisting of copper, chromium, iron, manganese, niobium, nickel, titanium and vanadium and alloys of two or more on at least one of the members at the surfaces to be joined, (2) placing the joint surfaces in intimate contact, (3) heating the members to a temperature below the allotropic transformation temperature of the zirconium or zirconium-base alloy members whereby a small amount of a joint alloy having a lower allotropic transformation temperature is formed at the joint interface and transformation of said joint alloy to a second phase permitting a high diffusion rate of zirconium occurs at the joint thereby promoting diffusion of zirconium and grain growth across the interface, and (4) maintaining the members at said temperature for a length of time sufficient to permit substantially complete diffusion of the joint alloy into the members, whereby the joint alloy is so diluted that the second phase at the joint reverts to said first phase.

The thickness of the metal coating used will fall in the range of from 25 angstroms to about 10,000 angstroms, and the bonding temperatures will be in the range from 1000° F. to 1560° F. or slightly more, depending upon the joint alloy formed, but in any case, will not exceed 1584° F. for pure zirconium at which the alpha to beta transformation occurs. In zirconium-base alloys the maximum temperature will be somewhat less, namely, below the temperature at which the alpha to beta transformation occurs rapidly.

The use of the process of the present invention overcomes the need to bond in the temperature range at which the transformation from alpha to beta occurs in the entire mass of the zirconium and zirconium-base alloy components, which transformation adversely affects, as indicated previously, the corrosion resistance properties of the alloys. This is accomplished by permitting the transformation to the beta phase in only an extremely limited region at the bond interface, where it is required for rapid atom transfer across the interface for bonding purposes, at temperatures in a range below that at which the alpha to beta transformation occurs rapidly in the zirconium and zirconium-base alloys from which the components are made. Furthermore, by means of the process of the present invention, after the beta phase has been established in the joint interface region and has served its function of promoting the bonding of the members, the phase can be completely removed by diffusion, even from the original bond area, prior to cooling to room temperature.

The highly desirable result set forth in the preceding paragraph is based on the metallurgical fact that the temperature at which an allotropic modification occurs in the pure metal (such as the alpha to beta transformation in zirconium) or in an alloy (such as the "Zircaloy" zirconium-base alloys mentioned) can be substantially changed by alloying with other metals. For example, in pure zirconium, the alpha to beta transformation occurs at 1584° F., whereas when alloyed with the metals listed below in Table I, the transformation temperature is lowered as indicated:

TABLE I

| Metal: | Lowest alpha to beta transformation temperature in system, ° F. |
|---|---|
| Cu | 1512 |
| Cr | 1535 |
| Fe | 1472 |
| Mn | 1463 |
| Nb | 1130 |
| Ni | 1486 |
| Ti | 995 |
| V | 1431 |

The transformation temperature would also be comparably lowered in zirconium-base alloys by these elements, although the temperatures in that case would be slightly different.

In general terms, the following procedure is suitable for the solid state bonding of zirconium and zirconium-base alloys:

(1) The surfaces are prepared for bonding by appropriate abrading and cleaning.

(2) The surfaces to be bonded are then provided with a thin film of one or more of the metallic elements, such as those listed in Table I, which when alloyed with zirconium are known to lower the alpha to beta transformation temperature. The coating may be accomplished by vapor deposition, electrochemically or by any other convenient means. Thicknesses of the coating will lie in the range of from 25 to about 10,000 angstroms.

(3) The bonding is performed at a temperature above the minimum alpha to beta transformation temperature of the particular metal-zirconium system being employed, but below the alpha to beta transformation temperature for zirconium or the zirconium-base alloy being bonded, for an appropriate time and at an appropriate pressure, for example, 10,000 p.s.i. During this stage the coating element will diffuse into and alloy with the zirconium or zirconium-base alloy and upon reaching a certain concentration will result in the formation of the beta phase.

(4) The heating is continued at the bonding temperature (but pressure need not be applied at this stage) after a bond has been effected for a length of time sufficient to permit the diffusion of the alloying element away from the bond interface region. The concentration of the alloying element in the member is decreased to a level such that an all alpha structure is obtained throughout the zirconium or zirconium-base member by the reverse transformation from beta to alpha.

There, follow examples of the process in which successful bonds were obtained.

*Example I*

The metal to be bonded is an alloy known as Zircaloy-4 having a nominal composition of 1.45% tin, 0.15% iron, 0.10% chromium, 0.007% nickel maximum and the balance zirconium. Plates of this alloy are belt abraded to 240 microinch surface roughness. The plates are then cleaned by vapor degreasing, scrubbing in alkaline and acid rinses, followed by a final rinse in deionized water. The cleaning operation is followed by coating each of the plates with a 3000 to 5000 angstrom layer of copper by means of vapor deposition in a vacuum from a tungsten filament. The bonding process is carried out for four hours at 1550° F. employing a pressure of 10,000 p.s.i. A strong bond is formed and an eutectoid structure is present at the bond interface. Under the microscope the members show no discontinuity except for a slight eutectoid dispersion. It is known that below a temperature of 1512° F. the beta phase forms such an eutectoid, so it is clear that the beta phase was present at the bonding temperature. It is noted that, in the general area of the joint interface, diffusion of the eutectoid had begun away from the bond area, indicating that the concentration of copper at the original joint interface was decreasing.

*Example II*

The technique of Example I is repeated except that a diffusion period after bonding of seven days is employed. A strong bond is formed. At the end of that period the bond region was examined and it was noted that a homogeneous unit was evident except for an eutectoid structure barely observable in the joint interface region indicating that diffusion was incomplete.

*Example III*

The technique of Example I is repeated except that each plate is coated with a 50 angstrom layer of copper by means of vapor deposition from a tungsten filament. The bonding operation is carried out for 4 hours at a temperature of 1525° F. at 10,000 p.s.i. Bonding is followed by holding the members for 24 hours at 1525° F. for diffusion of the alloy away from the interface. When the joint interface was examined no eutectoid was observed, indicating that complete diffusion of the copper into the base alloy had been accomplished and that no beta phase remained in the alloy member. The joint was sound.

*Example IV*

Employing the general method of Example I, a series of bonds are formed using a vapor deposited titanium coating on each plate of 50 angstroms thickness and bonding temperatures of 1450° F., 1500° F. and 1550° F. Sound bonds were made by this process.

Joints can be prepared by depositing a layer of copper and then a thin layer of titanium, each for example, 100 angstroms thick, and then completing the process.

Example V

The technique of Example IV was repeated employing titanium coating thicknesses of 500 angstroms on each plate. Sound bonds were produced.

Example VI

The technique of Example IV was repeated using a titanium coating on each plate 5000 angstroms thick. Sound bonds were made by this process.

In a similar manner joints may be prepared using one or more of the elements chromium, iron, manganese, niobium, nickel and vanadium.

Accordingly, the process of this invention circumvents a perplexing problem in the field of bonding zirconium and zirconium-base alloys in that the phase most favorable for bonding is most detrimental to the corrosion resistance properties of the alloys. In the process of this invention, the phase most suitable for bonding is present in small amounts where it is most needed at the joint interface, and it is thereafter substantially completely eliminated from the alloy member so that only the phase most suitable under operating conditions is present in the alloy members when the members are utilized and subjected to a high temperature corrosive environment.

It will be understood that the above description is illustrative and not limiting.

We claim as our invention:

1. In a process for bonding zirconium and zirconium-base alloy members wherein the members are composed of a highly corrosion resistant alpha phase, the steps comprising, depositing a thin layer of from 25 to 10,000 angstroms in thickness of at least one element selected from the group consisting of copper, chromium, iron, manganese, niobium, nickel, titanium and vanadium and alloys of two or more on at least one of the members at the surfaces to be joined, pressure bonding the members by placing the joint surfaces in intimate contact with positive bonding pressure and heating the members to a temperature in the range of from 1000° F. to 1560° F. which is below the temperature at which an allotropic transformation to beta phase occurs whereby a small amount of a joint alloy having a lower transformation temperature is formed at the joint interface and transformation to said beta phase occurs at the joint only thereby promoting diffusion of zirconium and grain growth across the interface, maintaining the members in said temperature range for a length of time of from 30 minutes to 7 days which is sufficient to permit diffusion of the joint alloy into the members, whereby the joint alloy is so diluted that the beta phase alloy at the joint reverts at least in part to said alpha phase.

2. In a process for bonding members composed of zirconium and zirconium-base alloys which are essentially in the alpha phase, the steps comprising, depositing a copper layer having a thickness of from 25 to 10,000 angstroms on at least one of the members at the surface to be bonded, pressure bonding the members by placing the surfaces to be bonded in intimate contact with positive bonding pressure and heating the members to a temperature in the range from 1512° F. to 1560° F. whereby a small amount of zirconium-copper alloy is formed at the joint interface which transforms to the beta phase thereby promoting formation of a bond by diffusion and grain growth across the interface, maintaining the members in said temperature range for a period from 30 minutes to 7 days so that the diffusion of the copper-zirconium alloy into the base members occurs whereby the copper-zirconium alloy is so diluted that the beta phase at the joint interface reverts to the alpha phase.

3. In a process for bonding members composed of zirconium and zirconium-base alloys which are essentially in the alpha phase, the steps comprising, depositing a titanium layer having a thickness of from 25 to 10,000 angstroms on at least one of the members at the surface to be bonded, placing the surfaces to be bonded in intimate contact with a positive bonding pressure of about 10,000 p.s.i. and heating the members to a temperature in the range from 1000° F. to 1560° F. whereby a small amount of a zirconium-titanium alloy is formed at the joint interface which transforms to the beta phase thereby promoting formation of a bond by diffusion and grain growth across the interface, maintaining the members in said temperature range for a period from 30 minutes to 7 days so that diffusion of the titanium of the zirconium-titanium alloy into the base members occurs whereby the zirconium-titanium alloy is so diluted that the beta phase at the joint interface reverts to the alpha phase.

References Cited in the file of this patent

UNITED STATES PATENTS

| 2,633,633 | Bogart et al. | Apr. 7, 1953 |
| 2,714,760 | Boam et al. | Aug. 9, 1955 |
| 2,850,798 | Bowman et al. | Sept. 9, 1958 |
| 2,859,512 | Dijksterhuis et al. | Nov. 11, 1958 |